United States Patent Office 3,098,715
Patented July 23, 1963

3,098,715
PROCESS FOR THE MANUFACTURE OF HYDROGEN PEROXIDE
Gerhard Käbisch and Siegmar Läufer, Rheinfelden, Baden, Germany, assignors, by mesne assignments, to FMC Corporation, a corporation of Delaware
No Drawing. Filed June 27, 1960, Ser. No. 38,757
Claims priority, application Germany July 8, 1959
6 Claims. (Cl. 23—207)

This invention relates to the production of hydrogen peroxide by the alternate reduction and oxidation of anthraquinones, and particularly to the employment of an improved class of anthraquinone working compounds.

It is known that anthraquinone compounds and their tetrahydro derivatives can be used as working compounds in a process for producing hydrogen peroxide. In this process, commonly known as the anthraquinone process, the working compound is dissolved in a suitable solvent, or solvent mixture, and is alternately reduced and oxidized to produce hydrogen peroxide. The hydrogenation is performed in the presence of catalysts to facilitate the reduction of the quinone form of the working material. The hydrogen peroxide product, which is derived from the oxidation step, generally is removed from the working solution by extraction with water. The detailed operation of this process is described fully in United States Patents Nos. 2,158,525 and 2,215,883.

In carrying out the anthraquinone process, the hydrogenation of a mole of the quinone form of the working material theoretically produces one mole of the hydroquinone form of this working material. When this is oxidized, it theoretically yields one mole of hydrogen peroxide intermixed with the original mole of the working material in its quinone form. Upon water extraction, a mole of hydrogen peroxide is obtained as product, with the original mole of working material in its quinone form being returned to the working solution. Accordingly, the amount and concentration of peroxide which is obtained as product depends upon the moles of working compound which are alternately reduced and oxidized per pass through the equipment.

Therefore in order to carry out this process commercially, enough anthraquinone working compound must be dissolved in the working solution so that practical yields of hydrogen peroxide are obtained per pass of working solution through the system. An increase in the solubility of the working compound in the working solvent, proportionally increases the hydrogen peroxide content which is released in the work solution and which subsequently can be extracted. With this relationship in mind, the prior art has chosen two separate and distinct methods for increasing the solubility of the anthraquinone working compounds in the working solutions.

The first group makes use of special solvents, or solvent mixtures, with preferred solution power for various anthraquinone compounds. Among the solvents which are employed are hydrocarbons, alcohols, ketones, carboxylic acid esters, phosphoric acid esters, ethers, and others. More specific processes employing improved solvents, or solvent mixtures, are taught in German Patent 942,807 and United States Patents 2,537,516, 2,537,655 and 2,668,753.

The second group increases the amount of working compound dissolved in a unit quantity of working solution by employing special anthraquinone derivatives with preferred higher solubilities. Thus, in place of the conventionally employed 2-ethyl anthraquinone, United States Patent 2,689,169 teaches a working compound having even greater solubility, namely, 2-tert-butyl anthraquinone. Other compounds, such as hetero nuclear disubstituted alkyl hydroquinones taught in German Patent 1,051,257, exhibit a very high solubility, as well as a high stability against over hydrogenation. Compounds, such as anthraquinone-2-sulfonic acid taught it British Patent 803,121, have been suggested as working compounds because of their increased solubility.

However, one of the difficulties which has arisen in the use of these, and certain other working compounds, is that the increased solubility obtained is of relatively small magnitude, coupled with the inability to obtain even these increased solubilities in all of the universally employed solvents; that is, while some of these anthraquinone derivatives possess increased solubilities in specific solvents, this increased solubility is restricted to only a few of the commercially employed solvents. Additionally, the high cost of these compounds has prevented their acceptance in large scale commercial practice.

It is an object of this invention to employ novel working compounds in the anthraquinone process for producing hydrogen peroxide which have a greatly increased solubility in substantially all of the universally employed solvents and which are readily available at low cost.

This and other objects will be apparent from the following description of the instant invention.

It has now been determined unexpectedly that esters of monobasic or dibasic anthraquinone carboxylic acids, or their tetrahydro derivatives, are excellent working compounds. The alcoholic component of these esters can be aliphatic or cycloaliphatic. If aliphatic, they can be monohydric or polyhydric; they can be straight-chain or branched, and can contain other groups, e.g. aromatic or alkoxy substituents on the aliphatic chain.

The present anthraquinone carboxylic esters have many advantages over the more conventionally employed anthraquinone working compounds. Among these is the excellent solubility of these esters with all conventional solvents which have been suggested for use in the anthraquinone process, rather than being restricted to a specific solvent. Additionally, the tetrahydro anthraquinone carboxylic esters which result from nuclear hydrogenation of their corresponding precursor esters show this increased solubility not only in the quinone form but also in the reduced form of the ester. Since these tetra compounds also can be reduced and oxidized cyclically to produce hydrogen peroxide, any gradual conversion of the anthraquinone carboxylic ester to its corresponding tetrahydro derivative does not remove the advantageous solubility possessed by the non-nuclear hydrogenated anthraquinone esters.

It has been determined further that the excellent solubility of these anthraquinone carboxylic esters may be increased even more if the alcohol component, which is used for esterifying the carboxylic acid, is at the same time also a component of the solvent, or at least possesses a similar structure to the alcohol component. Thus, while the present class of the working compounds can be used with any universally employed solvent to increase the solubility therein, even greater solubilities can be obtained if one desires to employ the alcohol component as one of the working solvents.

The present class of working compounds, because of their increased solubility in working solvents, permits the anthraquinone process to be carried out in an open-air plant without the problem of crystallizing out some of the working compound dissolved in the solvent. Therefore the insulation or mild heating, which must be applied to both containers and pipe lines carrying working solutions containing conventional working compounds dissolved therein, need not be resorted to when employing the instant working compounds.

Another advantage which the present anthraquinone carboxylic esters have over the more conventional working compound, such as 2-ethyl anthraquinone, is a greater increase in the solubility of the hydroquinone form of this working compound. In the past it was found that the hydrogenated form of the working compound was always more difficult to dissolve than the oxidized form. As a result, special solvent mixtures had to be employed in order to dissolve the hydrogenated form of the anthraquinone being employed. This in turn reduced the amount of quinone solvent available for dissolving the oxidized form of the anthraquinone, and further decreased the amount of working compound which could be dissolved in the working solution. The increased solubility of the present working compound, in both the quinone form and hydroquinone form, permits the proportion of solvent used to dissolve the hydrogenated anthraquinone in the working solvent to be reduced markedly. Thus, increased amounts of both oxidized and reduced working compound are circulated per pass through the process.

Still another advantage of the present anthraquinone carboxylic esters is their relatively inexpensive and ready availablility on a commercial scale. These esters can be obtained in over 90% yields from readily available anthraquinone carboxylic acids by merely esterifying them with the desired monohydric or polyhydric alcohols.

The specific esters which are the preferred embodiments of the present invention are those of anthraquinone monocarboxylic acid and anthraquinone dicarboxylic acid which have low melting points. These low melting point esters have been found to have a preferred high solubility in conventional solvents for the anthraquinone process. The high correlation between the melting points of these esters and their solubility permits selection of those esters that have high solubility by determining their melting points.

The first group of these low-melting anthraquinone monocarboxylic esters are those produced from primary monohydric alcohols. The aliphatic chain of these alcohols can be either straight or branched and preferably should contain between about 5 to 11 carbon atoms. It is further understood that the aliphatic chain of these alcohols may contain other substituents such as alkoxy, aromatic, or cycloaliphatic groups.

The following examples illustrate the method for producing these esters and the desirable results obtained when utilizing these esters. The specific esters and their melting points are tabulated below. These examples are given to illustrate the principle of the invention and are not deemed to be limitative of it.

EXAMPLE 1

A mixture of 12.6 g. of 2-anthraquinone carboxylic acid (M.P. 294° C.) and 11.6 g. of n-heptanol (M.P. 176° C.) was added to toluene as the reaction medium. To this mixture was added 0.5 g. of p-toluene sulfonic acid was the catalyzing agent. The mixture was refluxed for 17 hours during which the resulting reaction water was continuously drawn off. The major amount of excess heptanol was then distilled off. The reaction product was twice purified by chromatography using Brockmann $Al_2O_3$ in a column, and a total of 16.5 g. (94.3% of theory) was recovered. It had a melting point between 68–71.5° C., and after recrystallization from gasoline had a melting point of 72–73° C. This component was identified as 2-anthraquinone carboxylic n-heptyl ester.

In a similar manner, other esters of 2-anthraquinone carboxylic acid esters were prepared using primary, unbranched alcohols having varying carbon chains. The esters so prepared and their melting points are tabulated in Table I.

*Table I*

| Alcoholic component of ester | Carbon atoms | Melting point ° C. |
|---|---|---|
| Methyl | 1 | 167 |
| Ethyl | 2 | 147 |
| n-Propyl | 3 | 116 |
| n-Butyl | 4 | 123 |
| n-Amyl | 5 | 92 |
| n-Hexyl | 6 | 89 |
| n-Heptyl | 7 | 77 |
| n-Octyl | 8 | 87 |
| n-Nonyl | 9 | 92 |
| n-Decyl | 10 | 94 |
| n-Undecyl | 11 | 92 |
| n-Dodecyl | 12 | 97 |

EXAMPLE 2

A second anthraquinone monocarboxylic ester was prepared by adding 126.1 g. of 2-anthraquinone carboxylic acid (M.P. 294° C.) to 65 g. of α-ethylhexanol in 800 cc. of toluene as the reaction medium. Five grams of p-toluene sulfonic acid were added, and the mixture was boiled for 20 hours under reflux. The resulting water of reaction, amounting to 9.7 cc., was continuously drawn off. The reaction mixture was then filtered, and the principal amount of toluene and excess α-ethylhexanol was distilled off. The residue was purified by chromatography using Brockmann $Al_2O_3$ in a column and yielded 171.2 g. (94% of theory) of a substance having a melting point of 56° C. It was identified as 2-anthraquinone carboxylic α-ethylhexyl ester.

In substantially the same manner as described above, additional esters of 2-anthraquinone carboxylic acid were prepared using primary branched-chained aliphatic alcohols, as the alcoholic component. The esters so prepared and their melting points are tabulated in Table II.

*Table II*

| Alcoholic component of ester | Carbon atoms | Melting point ° C. |
|---|---|---|
| Isobutyl | 4 | 122 |
| 2-methyl, butyl | 5 | 95 |
| α-Ethyl hexyl | 8 | 56 |
| 2,6 dimethyl heptyl | 9 | 72 |

In the same manner as the 2-anthraquinone carboxylic esters of Table II were prepared, similar esters having as their alcoholic components primary aliphatic monohydric alcohols, whose aliphatic chain contains other substituents, were made. The esters so prepared and their melting points are tabulated in Table III.

*Table III*

| Alcoholic component of ester | Carbon atoms | Melting point ° C. |
|---|---|---|
| 2-methoxy ethyl | 3 | 129.5 |
| 2-ethoxy ethyl | 4 | 85 |
| 2-phenyl ethyl | 9 | 136.5 |

Secondary monohydric alcohols can also be used as the alcoholic component of the anthraquinone monocarboxylic ester. These secondary alcohols can be either aliphatic or cycloaliphatic. Further, when aliphatic alcohols are used, the carbon chain can either be straight or branched and may specifically contain other constituents on the chain such as an alkoxy, aromatic, or cycloaliphatic group. A secondary monohydric alcohol was used to prepare the following esters.

EXAMPLE 3

A mixture of 84 g. of 2-anthraquinone carboxylic acid and 350 cc. of thionyl chloride was boiled for 2½ hours with reflux until all of the components dissolved. The reflux tube was fitted with a calcium chloride tube. Excess thionyl chloride was distilled off, the last remnants being distilled in the presence of a vacuum. The residue obtained was distilled at 1 mm. Hg and yielded 90.7 g. of a component having a melting point of 144° C. (91.4% of theory). It had a melting point of 146–147° C. after recrystallization from gasoline and was identified as 2-anthraquinone carboxylic chloride.

A mixture of 6 g. of isopropyl alcohol and 27 g. of 2-anthraquinone carboxylic chloride was dissolved in 155 cc. of absolute benzene. This mixture was boiled under reflux for 16 hours. The reflux tube was fitted with a calcium chloride tube. The reaction mixture was cooled and purified by chromatography using Brockmann $Al_2O_3$ in a column. A total of 26.5 g. of a reaction product, having a melting point of 108–120° C. was obtained. After dissolution and recrystallization, a compound having a melting point of 138° C. was obtained and was identified as 2-anthraquinone carboxylic isopropyl ester.

In a similar manner, other anthraquinone carboxylic esters were made using secondary monohydric alcohols. The esters so prepared and their melting points are listed in Table IV.

*Table IV*

| Alcoholic component of ester | Carbon atoms | Melting point ° C. |
|---|---|---|
| Propanol-2 | 3 | 120 |
| Butanol-2 | 4 | 112 |
| Pentanol-2 | 5 | 71 |
| Octanol-2 | 8 | 59 |
| Nonanol-2 | 9 | 81 |
| Decanol-2 | 10 | 56 |
| Di-isobutylcarbinol, (2,6-dimethyl heptyl-4 ester) | 9 | 72 |
| Cyclohexanol | 6 | 118 |

An examination of Tables I to IV indicates that when the carbon number of the alcoholic components serving for esterification is in the range of about 5 to 11 carbon atoms, the ester has an especially low melting point. For this reason, the preferred anthraquinone carboxylic esters of the present invention are those in which the alkyl alcohol component has a carbon number of about 5 to 11 carbon atoms.

It is also possible to use tertiary alcohols as the alcoholic component of the anthraquinone carboxylic ester. This is demonstrated by the following procedure which was used to make an anthraquinone carboxylic ester using tertiary butyl alcohol as the alcoholic component of the ester.

EXAMPLE 4

Two point three grams of free sodium were dissolved in 200 cc. of tert.-butanol. The alcoholate formed was added dropwise at boiling heat to a solution of 27 grams of 2-anthraquinone carboxylic acid in benzene. The sodium chloride formed was separated, and the solution was brought to dryness. The residue was taken up in a small amount of benzene and purified by chromatography using Brockmann $Al_2O_3$ in a column. A total of 11.4 grams (37% of theory) of 2-anthraquinone carboxylic tert.-butyl ester, having a melting point of 121.5 to 122° C., was obtained.

It is further contemplated that polyhydric alcohols may be used as the alcoholic component of the anthraquinone monocarboxylic ester. Unlike the monohydric alcohols, which have been reviewed heretofore, the polyhydric alcohols have the property of forming either monoesters or diesters; that is, the alcoholic component can combine with either one or two molecules of the anthraquinone monocarboxylic acid.

Anthraquinone carboxylic esters were prepared using a polyhydric alcohol as the alcoholic component of the ester as follows.

EXAMPLE 5

A mixture of 25.2 g. of 2-anthraquinone carboxylic acid and 27 g. of ethylene glycol was added to 500 cc. of toluene containing 2 g. of p-toluene sulfonic acid. The mixture was boiled for 2 hours with reflux and the resulting water was continuously drawn off by azeotropic distillation. Thereafter, toluene and excess toluene glycol were distilled off and the residue purified by chromatography using Brockmann $Al_2O_3$ in a column. A total of 26.5 g. of 2-anthraquinone carboxylic-β-hydroxyethyl ester (88% of theory) having a melting point of 146–148° C. was obtained. This compound exhibited polymorphism; for the most part a product is obtained which initially melts at 123° C. and then again becomes solid and then melts at 148–149° C.

A mixture of 11.8 g. of 2-anthraquinone carboxylic acid and 4 g. of nonanediol-1,9 was added to 500 cc. of toluene containing 1 g. p-toluene sulfonic acid. The resultant mixture was boiled for 65 hours with reflux, and the water of reaction formed was continuously drawn off by azeotropic distillation. The cooled reaction mixture was purified by chromatography using Brockmann $Al_2O_3$ in a column. A product having a melting point of 158–164° C. was obtained. After dissolution and recrystallization, it had a melting point of 158° C. and was identified as bis-2-anthraquinone carboxylic nonanediester.

In a similar manner, other esters were made from anthraquinone monocarboxylic acid with the polyhydric alcohols listed in Table V. The esters so prepared and their melting points are listed in Table V.

*Table V*

| Alcoholic component of ester | Carbon atoms | Reaction product | Melting point, ° C. |
|---|---|---|---|
| Glycol | 2 | 2-anthraquinone carboxylic-β-hydroxy ethyl ester. | 148 |
| Do | 2 | bis-2-anthraquinon ecarboxylic ethylene diester. | 210 |
| Butanediol-1,4 | 4 | 2-anthraquinone carboxylic-γ-hydroxy butyl ester. | 138 |
| Do | 4 | bis-2-anthraquinone carboxylic tetra-methylene diester. | 104 |
| Pentanediol-1,5 | 5 | 2-anthraquinone carboxylic 5-hydroxy pentyl ester. | 109 |
| Do | 5 | bis-2-anthraquinone carboxylic pentamethylene diester. | 215 |
| Hexanediol-1,6 | 6 | 2-anthraquinone carboxylic 6-hydroxy hexyl ester. | 124 |
| Do | 6 | bis-2-anthraquinone carboxylic hexamethylene diester. | 232 |
| Nonanediol-1,9 | 9 | bis-2-anthraquinone nonamethylene diester. | 158 |
| Decanediol-1,10 | 10 | 2-anthraquinone carboxylic 10-hydroxy decyl ester. | 117 |
| Do | 10 | bis-2-anthraquinone decamethylene diester. | 184 |
| 2,2-dimethyl-propanediol-1,3 | 5 | 2-anthraquinone carboxylic γ-hydroxy β,β-dimethyl propylester. | 181 |
| 2,2-diethyl-propanediol-1,3 | 5 | 2-anthraquinone carboxylic γ-hydroxy β, -diethyl propylester. | 132.5–133.5 |
| 2-methyl-2-propyl-propanediol-1,3 | 7 | 2-anthraquinone carboxylic γ-hydroxy β-methyl β-propyl propylester. | 120 |
| 2-ethyl-2-butyl-propanediol-1,3 | 9 | 2-anthraquinone carboxylic γ-hydroxy β,β-diethyl propylester. | 115.5 |

When diols are used to esterify monoanthraquinone carboxylic acids, the subsequent esters obtained have a molecular weight which is approximately twice as great as the molecular weight of similar esters produced from monohydric alcohols. Because of this increase in molecular weight, the solubilities of these diesters are not particularly high. However, since one mole of these diesters will yield two moles of hydrogen perioxide per pass through the system, there being two anthraquinone molecules in the make-up of the diester molecule, their solubility need be only half as good as the corresponding anthraquinone carboxylic monoester.

Esterification of anthraquinone dicarboxylic acids, e.g. 2,3-anthraquinone dicarboxylic acid, takes place with the same relative ease as it does with the anthraquinone monocarboxylic acids, except that two moles of the alcoholic reactant combine with a single mole of the anthraquinone dicarboxylic acid forming the dicarboxylic ester. The mole solubility of the dicarboxylic esters, generally speaking, is not as good as the mole solubility of analogous monocarboxylic esters, since the former has a relatively higher molar weight. However, even the dicarboxylic ester compounds are superior to the conventional anthraquinone working compounds, e.g. 2-ethyl anthraquinone, particularly when the solvent employed contains an alcohol which is the same, or possesses a similar structure to the alcohol component serving for esterification of the carboxylic acid.

EXAMPLE 6

An anthraquinone dicarboxylic ester was prepared as follows: 29.8 grams of anthraquinione dicarboxylic-2,3 acid were boiled for 7½ hours with 80 grams of 2-ethyl hexanol in 500 cc. of toluene containing one gram of p-toluene sulfonic acid and refluxed. The water formed was distilled off azeotropically. After distilling off the solvent and the excess ethyl hexanol, the resultant ester was subjected to chromatography on $Al_2O_3$ by the Brockmann procedure. After elution and evaporation of the solvent, a honey-yellow oil remained behind which did not crystallize even after standing quite a long time (8 months). It was identified by infrared spectroscopy as anthraquinone dicarboxylic-2,3-bis-α-ethyl hexyl ester, and was present in a yield of 86%.

In a similar manner, the anthraquinone dicarboxylic esters were prepared. The esters so prepared and their melting points are listed in Table VI.

Table VI

| Acid component | Alcohol component | Reaction product | Melting point, °C. |
| --- | --- | --- | --- |
| Anthraquinone dicarboxylic-2,3. | Methanol | Dimethyl ester | 160 |
| Do | α-Ethyl hexanol | bis-α-Ethyl hexyl ester. | Liquid |
| Anthraquinone dicarboxylic-2,6. | do | do | 71 |

Surprisingly, the bis-α-ethyl hexyl ester of anthraquinone dicarboxylic-2,3 acid is liquid at temperatures above 0° C. It was found that it did not become crystalline even after repeated careful chromatography and after standing in the refrigerator for a long time. Responsibility for this, in the sense of the behavior desired for the anthraquinone process, is to be attributed to steric effects. Such steric effects were to be expected due to first the branching of the alcohol component and secondly to the ortho position of both carboxylic groups in the anthraquinone radical. Accordingly, this compound, because of its liquid state at temperatures of 0° C. and above, forms a preferred working compound for the anthraquinone process.

The tetrahydro derivatives of the anthraquinone carboxylic esters can be employed also as working compounds in the anthraquinone process. These tetrahydro derivatives can be prepared readily by hydrogenating the anthraquinone carboxylic ester in the presence of an active catalyst, e.g. Raney nickel, in a suitable solvent such as alcohol.

EXAMPLE 7

Tetrahydro anthraquinone carboxylic esters were produced by employing the following procedure.

Fifteen grams of 2-anthraquinone carboxllic-2-ethyl hexyl ester (M.P. 55° C.) were dissolved in 250 cc. of ethanol, and were hydrogenated at room temperature in the presence of 10 cc. of a Raney catalyst suspended under alcohol. After two-thirds of the calculated amount of hydrogen had been taken up, an increase in the temperature of the solution to 50° C. took place. After a total hydrogenation time of 2½ hours had elapsed, the reaction suddenly stopped after the consumption of the theroeticaly calculated amount of hydrogen. The weakly colored solution was then filtered with suction from the catalyst, oxidized by injecting air and recrystallized from methanol. A quantitative yield of tetrahydro 2-anthraquinone carboxylic-2-ethyl hexyl ester was obtained, having a melting point of 57–58° C.

In similar manner, the tetrahydro 2-anthraquinone carboxylic ethyl ester was prepared. The melting points of these anthraquinone carboxylic esters and their tetrahydro derivatives are recorded in Table VII.

Table VII

| Alcoholic component of the ester | M.P. of 2-anthraquinone carboxylic ester, °C. | M.P. of tetrahydro 2-anthraquinone carboxylic ester, °C. |
| --- | --- | --- |
| Ethanol | 147 | 106 |
| 2-ethyl hexanol | 56 | 57–58 |

A comparison of the melting points given in Table VII between the 2-anthraquinone carboxylic ester and its tetrahydro derivative indicates that the tetrahydro esters have similar, or even considerably lower, melting points than the precursor corresponding anthraquinone carboxylic ester. These findings are in complete contrast to the situation with conventional anthraquinone working compounds such as 2-ethyl anthraquinone.

EXAMPLE 8

In order to show the excellent solubility of the anthraquinone carboxylic esters, several typical esters and mixtures thereof, possessing low melting points, were dissolved in the solvent mixture consisting of a 40:60 ratio of methyl naphthalene to octyl alcohol. The solubility of a standard working compound, 2-ethyl anthraquinone, was also determined in this same solvent. Additionally, a mixture of 2-ethyl anthraquinone and one of the esters also was tested to determine its solubility. The temperature of the solvents was maintained at 20° C. in all cases. The solubility of these esters and mixtures thereof in their quinone form is reported in Table VIII.

Table VIII

| Alcoholic component of 2-anthraquinone carboxylic ester | M.P., °C. | Solubility in grams per 100 cc. of solvent |
| --- | --- | --- |
| n-Heptyl | 77 | 28.2 |
| 2-decyl | 57 | 38.5 |
| 2, 6-dimethyl heptyl | 72 | 34.3 |
| 2-ethyl hexyl | 56 | 36.2 |
| 2-octyl | 56 | 115.8 |
| 2-ethyl anthraquinone | 111 | 16.1 |
| 87.5 weight percent anthraquinone carboxylic hexyl ester, 12.5 weight percent anthraquinone carboxylic octyl ester | 61–63 | 44.5 |
| 40 weight percent 2-ethyl anthraquinone, 60 weight percent 2-anthraquinone carboxylic n-amyl ester | 64 | 47.2 |

EXAMPLE 9

In order to illustrate the universal applicability of the present esters in the conventional solvents used in the anthraquinone process, the solubilities of 2-ethyl hexyl ester of 2-anthraquinone carboxylic acid are compared with a conventional working compound, 2-ethyl anthraquinone, in Table IX. The solvents were maintained at 20° C., and the two working compounds tested were in their quinone form.

Table IX

| Solvent | Solubility of 2-ethyl anthraquinone in grams per 100 cc. of solvent | Solubility of 2-ethyl hexyl ester in grams per 100 cc. of solvent |
| --- | --- | --- |
| α-Methyl naphthalene | 36.5 | 127.6 |
| Methyl naphtahalene/octyl alcohol | 16.1 | 68.2 |
| Methyl cyclohexanol acetate | 6.5 | 25.8 |
| Methyl naphthalene/trioctyl phosphate (50:50 mixture) | 10.2 | 58.7 |

A further example of the universal applicability of these esters is found in the bis-(2-ethyl hexyl) ester of 2,3-anthraquinone dicarboxylic acid. This compound is liquid at room temperature and is miscible in any proportion at 20° C. with such solvents as benzene, methyl cyclohexanol acetate, and in mixtures of solvents such as 40:60 ratios of methyl naphthalene to ethyl hexanol.

Another important advantage which the present anthraquinone carboxylic esters possess over the conventional working compounds is an extremely high solubility in their hydroquinone form. This is extremely important since the solubility of the hydroquinone form of conventional working compounds is quite low and thereby reduces the amount of hydroquinone working compound which can be carried per pass through equipment. The solubility of the hydroquinone form of these esters is compared with 2-anthrahydroquinone in Example 10.

EXAMPLE 10

The hydroquinone forms of the compounds listed in Table X were dissolved in a solvent consisting of a 40:60 mixture of methyl naphthalene to octyl alcohol. The solubility of these working compounds was determined at 30° C. after standing for twenty-four hours.

Table X

| Working compound | Solubility of the hydroquinone form at 30°C. after 24 hrs. in grams per 100 cc. of solvent |
| --- | --- |
| 2-ethyl anthraquinone | 4.8 |
| 2-anthraquinone carboxylic ethyl hexyl ester | 10.5 |
| bis-(2-ethyl hexyl) ester of 2,3-anthraquinone dicarboxylic acid | 25.6 |
| 87.5 weight percent anthraquinone carboxylic hexyl ester, 12.5 weight percent anthraquinone carboxylic octyl ester | 21.3 |
| 40 weight percent 2-ethyl anthraquinone, 60 weight percent 2-anthraquinone carboxylic n-amyl ester | 19.5 |

While the anthraquinone carboxylic esters and diesters have been found to be superior to previously employed working compounds in the anthraquinone process, three of these esters have been shown to be the preferred embodiments of this class. These are 2-anthraquinone carboxylic 2-octyl ester, 2-anthraquinone carboxylic α-ethyl hexyl ester, and 2,3-anthraquinone dicarboxylic-bis-(α-ethyl hexyl) diester. The 2-octyl ester has a molar solubility which is 4.7 times that of ethyl anthraquinone in the quinone form of working compound, while that of α-ethyl hexyl ester is 2.7 times as great. This latter compound also has a further advantage in that its tetrahydro ester also has a very low melting point and therefore a very favorable high preferred solubility. Additionally, the α-ethyl hexyl ester has a molar hydroquinone solubility which is 2.2 times as great as that of ethyl anthraquinone and therefore is greatly superior to the latter, not only in the quinone form but also in the hydroquinone form.

The 2,3-anthraquinone dicarboxylic bis-α-ethyl hexyl diester is an unusually desirable working compound because it is liquid at room temperatures and therefore is miscible with many working solutions in all proportions. This degree of solubility for working compounds has heretofore never been known. Additionally, the molar solubility of the hydroquinone form of this compound is 5.3 times as great as that of the hydroquinone form of ethyl anthraquinone.

In order to show the actual production of hydrogen peroxide with compounds possessing this increased solubility in conventional working solutions, the following examples were run as reported in Examples 11 and 12.

EXAMPLE 11

A work solution is prepared containing 100 grams of 2-ethyl anthraquinone per liter. The solvent consists of a 30:70 methyl naphthalene/octyl alcohol mixture. The work solution is introduced into the cycle in such a way that the hourly flow amounts to 10 liters. The solution is hydrogenated in the hydrogenation apparatus in the presence of a hydrogenation catalyst until 50% of the ethyl anthraquinone is converted into the hydroquinone form. The hydrogenation catalyst is filtered off in the next stage. After oxidation with air in a gas-treatment pipe, the work solution contains about 7.2 grams of $H_2O_2$/liter. Extraction is carried out in a sieve-bottom column, in which over 98% washing out takes place. One part of water is used for washing out 20 parts of organic phase, which is charged with $H_2O_2$ in the column. Five hundred and seventy cubic centimeters of a 12.3 weight percent $H_2O_2$ solution are obtained per hour.

EXAMPLE 12

A work solution is prepared containing 270 grams of 2-anthraquinone carboxylic-α-ethyl hexyl ester per liter. The solvent consists of a 30:70 methyl naphthalene/ethyl hexanol mixture. The work solution is introduced into the cycle in the apparatus described in Example 11, whereby an hourly flow of 10 liters is likewise maintained. In the case of 50% hydrogenation, the work solution after oxidation contains 12.6 grams of $H_2O_2$ per liter. On extraction, which likewise takes place according to Example 11, 620 cc. of a 20 weight percent $H_2O_2$ solution per hour are obtained.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the cyclic process of producing hydrogen peroxide by the alternate reduction and oxidation of an anthraquinone working compound carried in a liquid organic solvent, the improvement which comprises employing as said working compound an ester whose acid residue is selected from the group consisting of anthraquinone and tetrahydroanthraquinone carboxylic acids having from one to two carboxylic acid radicals, and whose alcoholic residue is selected from the group consisting of aliphatic and cycloaliphatic alcohols.

2. In the cyclic process of producing hydrogen peroxide by the alternate reduction and oxidation of an anthraquinone working compound carried in a liquid organic solvent, the improvement which comprises employing as said working compound an ester whose acid residue is selected from the group consisting of anthraquinone and tetrahydroanthraquinone carboxylic acids having from one to two carboxylic acid radicals, and whose alcoholic residue is an aliphatic monohydric alcohol having from about 5 to about 11 carbon atoms.

3. In the cyclic process of producing hydrogen peroxide by the alternate reduction and oxidation of an anthraquinone working compound carried in a liquid organic solvent, the improvement which comprises employing as said working compound an ester whose acid residue is selected from the group consisting of anthraquinone and tetrahydroanthraquinone carboxylic acids having from one to two carboxylic acid radicals, and whose alcoholic residue is an aliphatic polyhydric alcohol.

4. The process of claim 1 wherein the working compound is 2-anthraquinone carboxylic 2-octyl ester.

5. The process of claim 1 wherein the working compound is 2-anthraquinone carboxylic α-ethyl hexyl ester.

6. The process of claim 1 wherein the working compound is 2,3-anthraquinone dicarboxylic bis-(α-ethyl hexyl) diester.

References Cited in the file of this patent
FOREIGN PATENTS

| | | |
|---|---|---|
| 783,709 | Great Britain | Sept. 25, 1957 |
| 803,121 | Great Britain | Oct. 15, 1958 |
| 834,264 | Great Britain | May 4, 1960 |

UNITED STATES PATENT OFFICE
CERTIFICATE OF CORRECTION

Patent No. 3,098,715                      July 23, 1963

Gerhard Käbisch et al.

It is hereby certified that error appears in the above numbered patent requiring correction and that the said Letters Patent should read as corrected below.

Column 2, line 8, for "hydroquinones" read -- anthraquinones --; line 11, for "it" read -- in --; column 3, line 69, for "was", first occurrence, read -- as --; column 6, Table V, under the heading "Reaction product", lines 7 to 9 from the bottom, for "2-anthraquinone carboxylic $\gamma$-hydroxy $\beta$, -diethyl propylester" read -- 2-anthraquinone carboxylic $\gamma$-hydroxy $\beta,\beta$-diethyl propylester --; column 6, line 73, for "perioxide" read -- peroxide --; column 7, line 74, for "carboxllic-2-ethyl" read -- carboxylic-2-ethyl --.

Signed and sealed this 12th day of May 1964.

(SEAL)
Attest:

ERNEST W. SWIDER
Attesting Officer

EDWARD J. BRENNER
Commissioner of Patents